Figure 1:
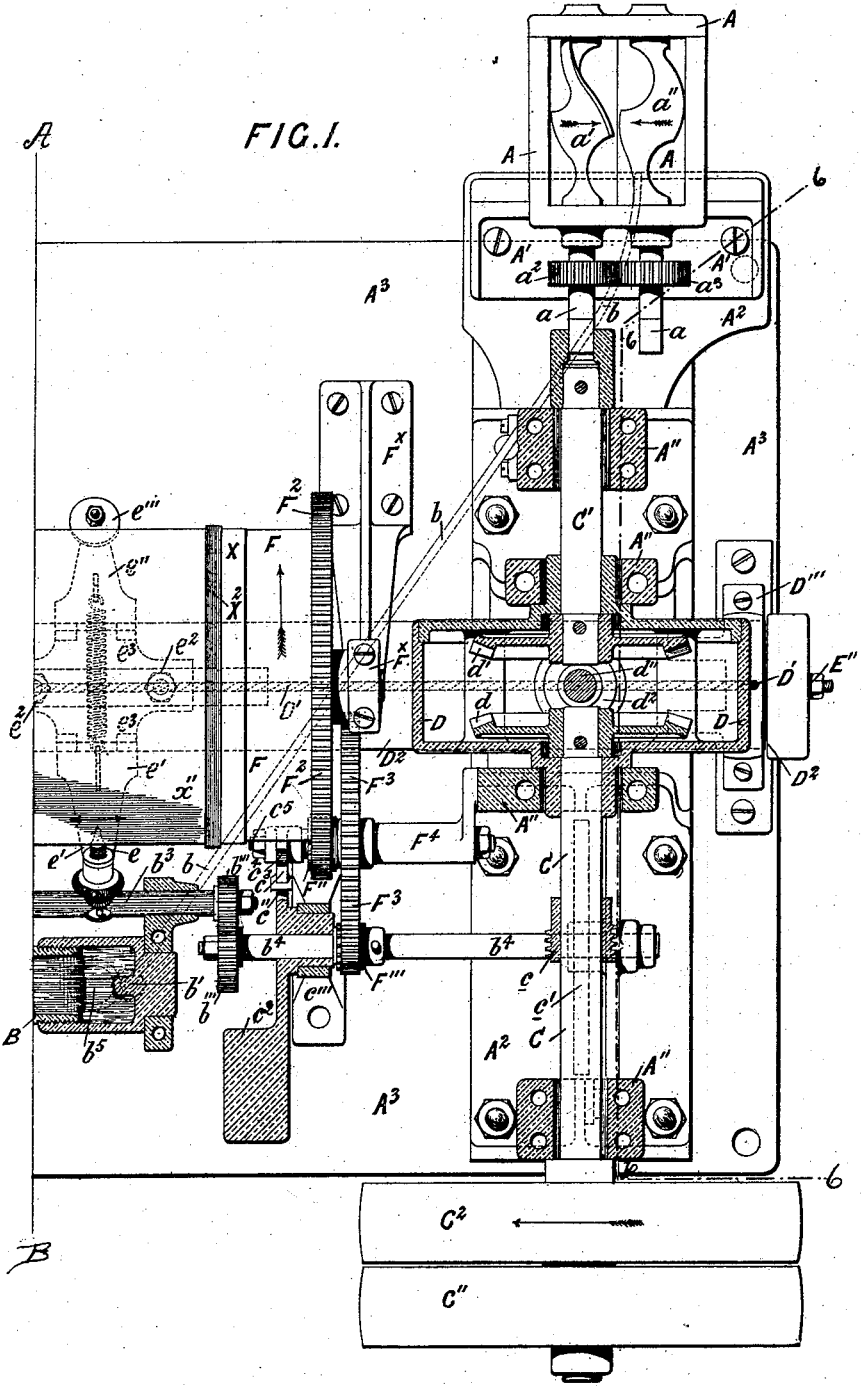

(No Model.) 9 Sheets—Sheet 1.
J. HOGARTH.
MECHANISM FOR TESTING AND RECORDING THE PROPERTIES OF FLOUR.

No. 474,636. Patented May 10, 1892.

WITNESSES.
George Baumann
J. C. Connor

INVENTOR.
James Hogarth
By his Attorneys
Howson and Howson (No Model.) 9 Sheets—Sheet 2.
J. HOGARTH.
MECHANISM FOR TESTING AND RECORDING THE PROPERTIES OF FLOUR.
No. 474,636. Patented May 10, 1892.
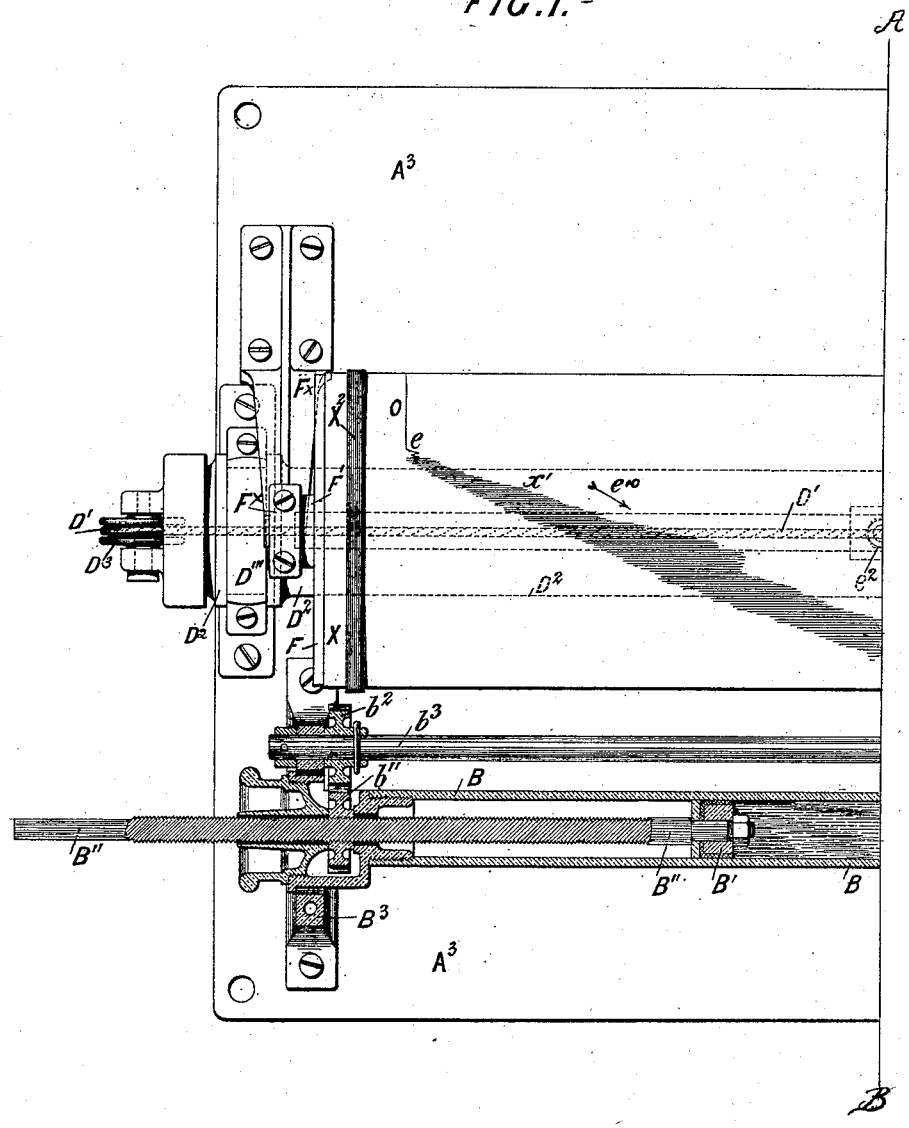
FIG. 1.ᴬ
WITNESSES. INVENTOR.

(No Model.) 9 Sheets—Sheet 4.
J. HOGARTH.
MECHANISM FOR TESTING AND RECORDING THE PROPERTIES OF FLOUR.
No. 474,636. Patented May 10, 1892.
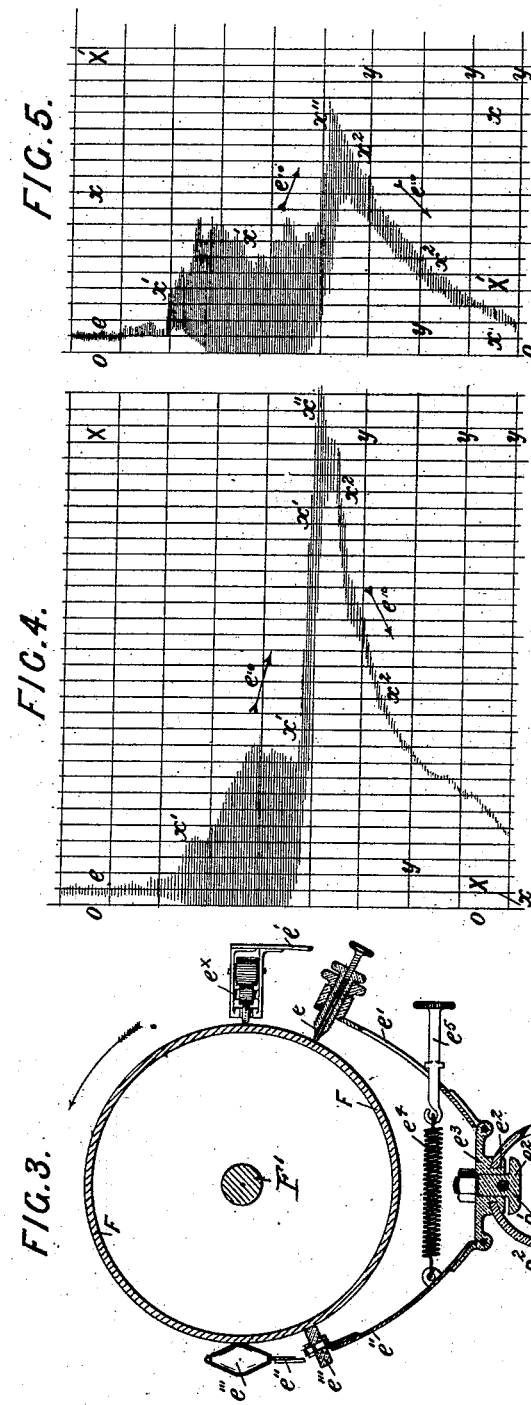
WITNESSES.
George Baumann
J. C. Connor
INVENTOR.
James Hogarth
By his Attorneys
Howson and Howson

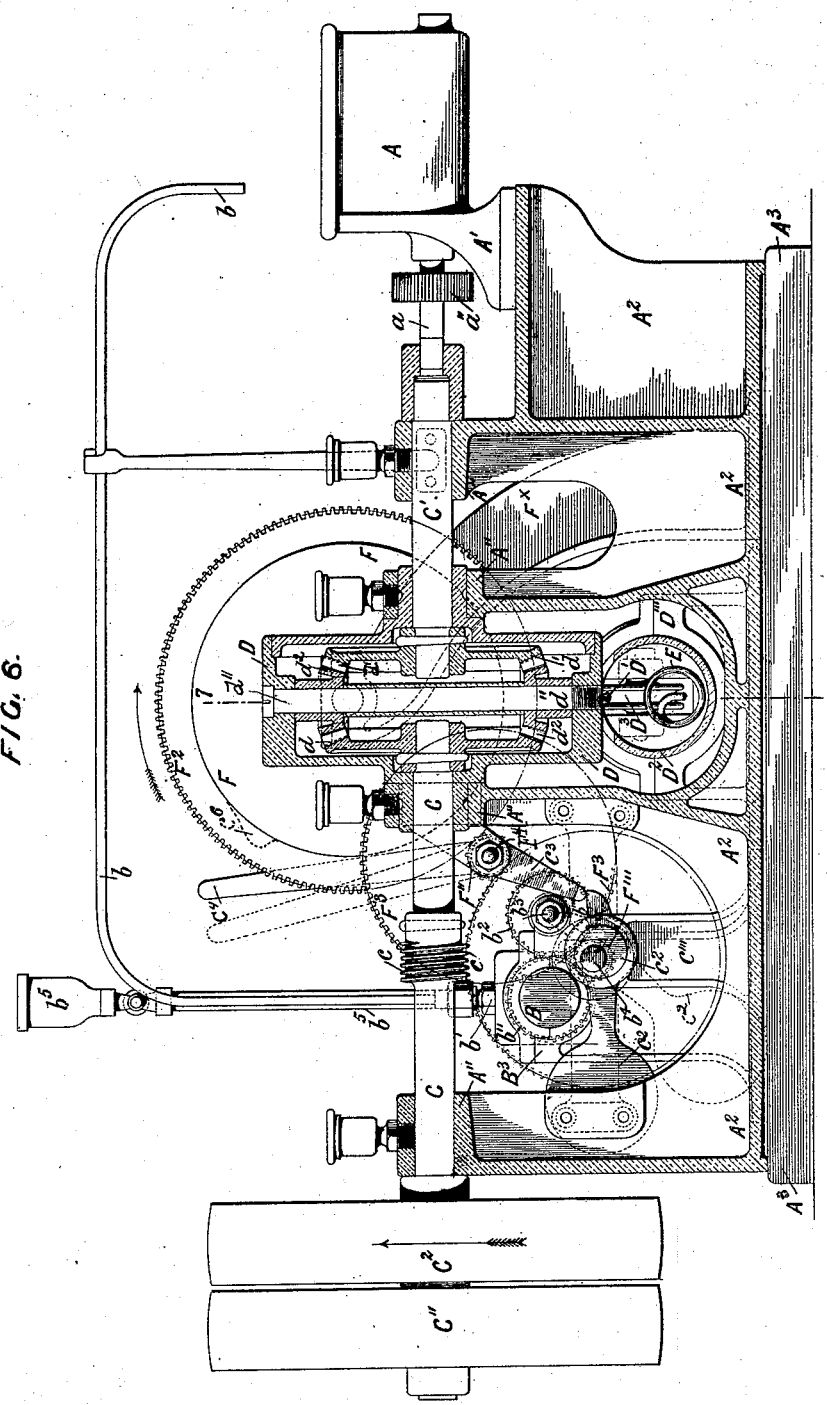

(No Model.) 9 Sheets—Sheet 6.

J. HOGARTH.
MECHANISM FOR TESTING AND RECORDING THE PROPERTIES OF FLOUR.

No. 474,636. Patented May 10, 1892.

WITNESSES
George Baumann
S. C. Connor

INVENTOR.
James Hogarth
By his attorneys
Howson and Howson (No Model.)　　　　　　　　　　　　　　　　9 Sheets—Sheet 7.
J. HOGARTH.
MECHANISM FOR TESTING AND RECORDING THE PROPERTIES OF FLOUR.

No. 474,636.　　　　　　　　　　Patented May 10, 1892.

WITNESSES.
George Baumann
S. C. Connor

INVENTOR:
James Hogarth
By his Attorneys
Howson and Howson (No Model.) 9 Sheets—Sheet 8.

J. HOGARTH.
MECHANISM FOR TESTING AND RECORDING THE PROPERTIES OF FLOUR.

No. 474,636. Patented May 10, 1892.

WITNESSES.
George Baumann
J. C. Connor

INVENTOR
James Hogarth
By his Attorneys
Howson and Howson (No Model.) 9 Sheets—Sheet 9.

J. HOGARTH.
MECHANISM FOR TESTING AND RECORDING THE PROPERTIES OF FLOUR.

No. 474,636. Patented May 10, 1892.

WITNESSES.
George Baumann
J. C. Connor

INVENTOR
James Hogarth
By his attorneys
Howson and Howson

UNITED STATES PATENT OFFICE.

JAMES HOGARTH, OF KIRKCALDY, SCOTLAND.

MECHANISM FOR TESTING AND RECORDING THE PROPERTIES OF FLOUR.

SPECIFICATION forming part of Letters Patent No. 474,636, dated May 10, 1892.

Application filed August 6, 1890. Serial No. 361,216. (No model.)

*To all whom it may concern:*

Be it known that I, JAMES HOGARTH, miller and corn merchant, of West Mills, Kirkcaldy, Fifeshire, Scotland, a subject of the Queen of Great Britain and Ireland, have invented a Mechanism for Testing and Graphically Recording the Properties of Flour, of which the following is a specification.

This invention has reference to and comprises a new or improved combination of appliances for mechanically testing and sampling different qualities of flour and graphically indicating and recording the various characteristics or properties of the different flours tested, such as the power of the flour to absorb water to yield a dough of a given consistency, the actual consistency of the dough in a kneading-machine, the proportional strain or power required to drive the kneading-machine after the sample of flour and water has been placed therein, the amount of bread each sack of flour will yield, and the quality of the gluten entering into the composition of any given sample of flour. These operations are effected under my invention by a combination of mechanism and mechanical movements and graphically recorded, as hereinafter described, by diagram lines or figures traced on lined paper, the spaced lines on the paper in the one or transverse direction indicating the quantity of water used in a given time and the spaced lines in the other or longitudinal direction at right angles to the former lines indicating the power or proportional power exerted in pounds pressure in mixing the flour and kneading the mixture or dough at the various times, and in order to enable others skilled in the art to which my invention relates to understand how it may be carried into practice I have hereunto appended explanatory drawings, in which the same reference-letters are used to indicate corresponding parts in all the figures where shown.

Figure 2:
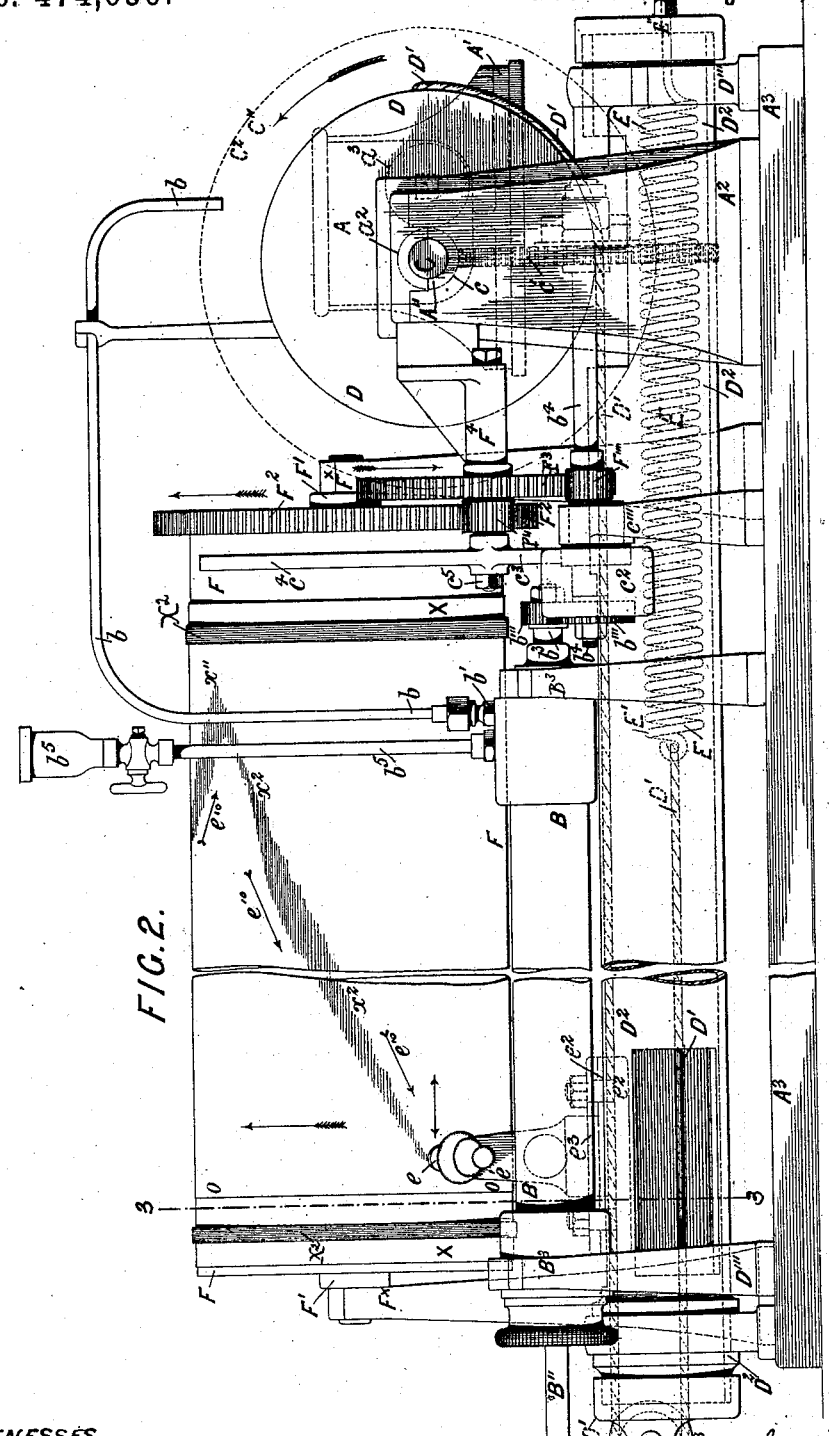
Figure 8:
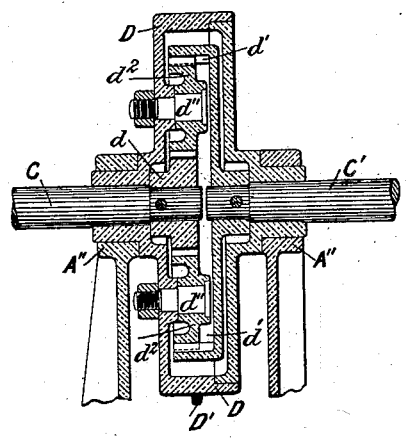
Figure 9:
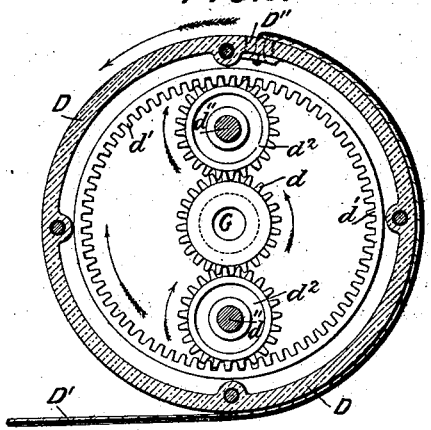
Figure 7:
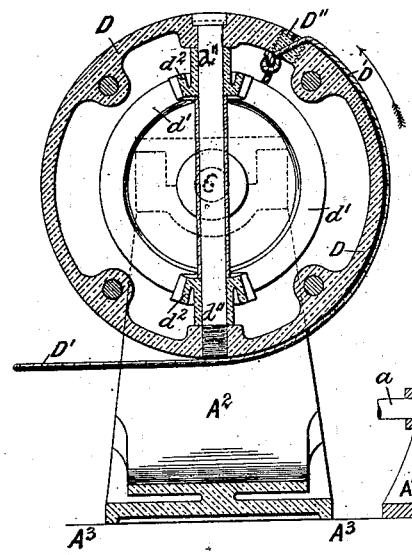
Figure 13:
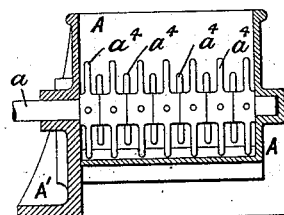
Figure 14:
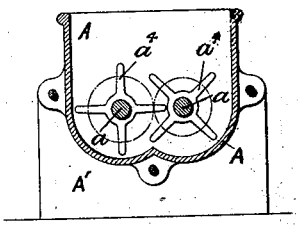
Figure 10:
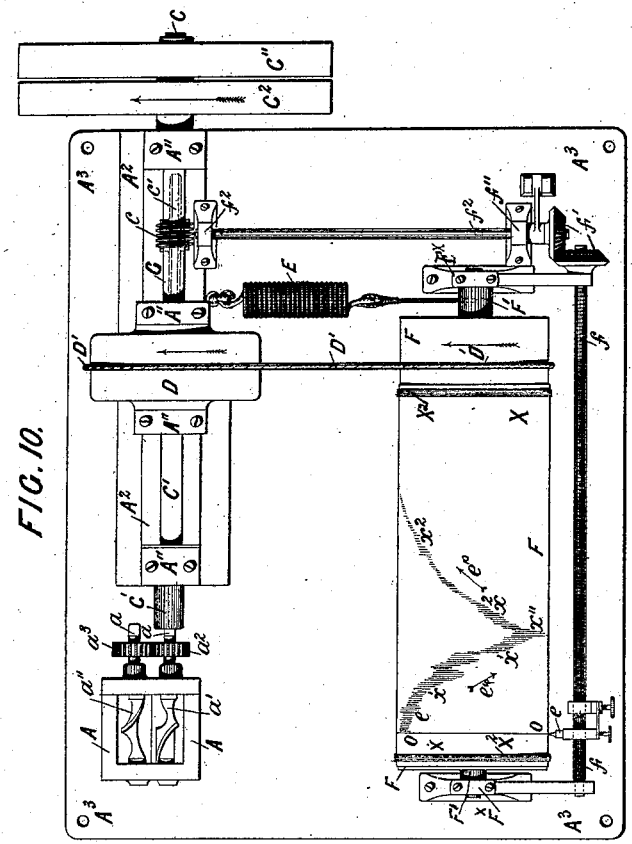
Figure 11:
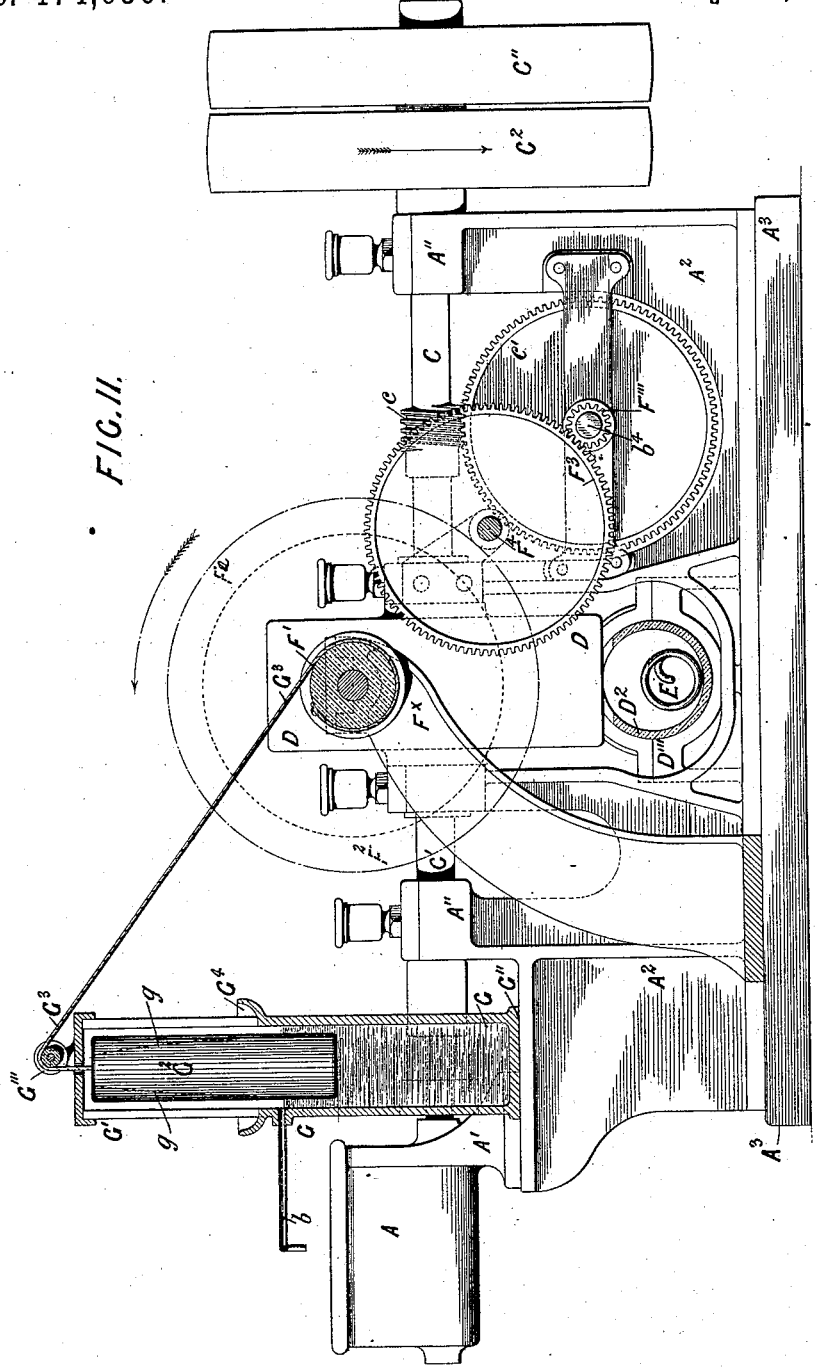
Figure 12:
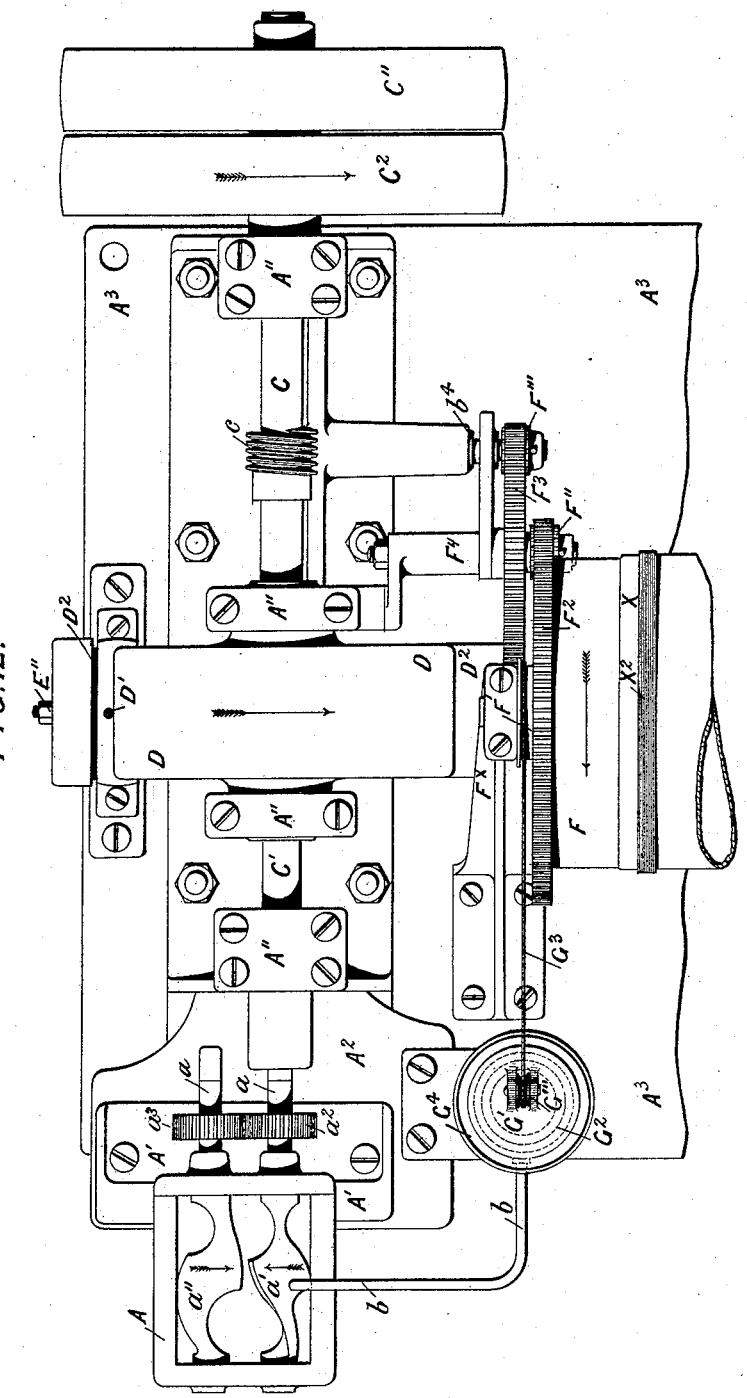

Figures 1 and 1$^A$, when the two figures are placed together so that the line A B of Fig. 1 coincides with the line A B on Fig. 1$^A$, show a general plan view with the dynamometer D on the shafts C C' and water-cylinder B in horizontal section, showing one construction or combination of the parts of the machine or mechanism in accordance with my invention. Fig. 2 is a front side elevation corresponding to Figs. 1 and 1$^A$, but with the bell driving-pulleys C$^2$ C'' removed; and Fig. 3 is a transverse section of the indicating mechanism and diagram-card barrel F, as taken on the lines 3 3 on Fig 2. Figs. 4 and 5 show part of two diagram-cards X X' as graphically taken on the indicator-barrel F from different samples of flour-dough in accordance with those movements. The small transverse lines and divsions $x$ indicate pressure from the zero-line O upward from the left to the right hand sides of the figures in pounds or other measures of weight, while the wide divisions and lines $y$ in the opposite or longitudinal direction indicate the quantity of water used during a given time or part of a revolution of the indicator-barrel F. Fig. 6 is a sectional end elevation of the machine shown in Figs. 1, 1$^A$, and 2, and as taken near the line 6 6 on Figs. 1 and 1$^A$. Fig. 7 is a transverse section through the dynamometer on the line 7 7 of and at right angles to Fig. 6. Figs. 8 and 9 show a sectional side elevation and transverse section, respectively, at right angles to each other through the center of another modification of the dynamometer D from that shown in the former figures and in which spur-gearing is substituted for bevel-gearing. Fig. 10 shows a plan view of a modification in which the dynamometer D is made to differentially move the barrel F and card X of the diagram proportionate to the toughness of the dough and the pencil regularly by the movement of the first-motion shaft—that is, vice versa to the first arrangement. Figs. 11 and 12 are a transverse section and plan, respectively, of the gearing end of the machine shown in Figs. 1$^A$ and 2, with another arrangement of the water-cylinder as applied thereto; and Figs. 13 and 14 show a longitudinal and transverse section, respectively, of the dough-mixer A, with different forms of stirrers or blades from that shown in the former figures.

Referring to the arrangement of mechanism shown in Figs. 1 to 7, the improvements consist, first, of a small mechanical kneading vessel or machine A, of any ordinary construction, bolted by a flanged bracket A' to the main end frame A², secured below to the main sole-plate A³ and carrying the bearing-brackets A'' of the shafts C C'. The dough-mixer A is fitted preferably with two revolving helical or equivalent blades a' a'' on spindles a a, geared together differentially by the wheels a² a³ and actuated to revolve from the end of the shaft C' toward one another on the upper side—that is, pressing the dough down in the center and separating and bringing it up at the opposite sides, as indicated by the arrows. The flour is first placed in this vessel A and the water is fed gradually in by the small pipe b at a slow uniform rate, preferably from the delivery end b' of a new or improved arrangement of feeder. This feeder is made in the form of a cylinder B, carried in the brackets B³ up from the base-plate A³, and the cylinder may be filled by the stand-pipe and filler b⁵, provided with a stop-cock. The cylinder B is fitted with a traversing piston B', reciprocated in the cylinder B at a slow uniform rate, as by the screw-spindle B'' of the piston B', traversed by a screw nut or pinion, with teeth b'' on its outer circumference, fitted on the outer end of the cylinder B and gearing into a pinion b² near one end of a transmitting-spindle b³, carried in bearings parallel to and in the same standards B³ which carry the water-cylinder B. This spindle b³ is actuated by the spur-wheels b''' at its other end from the disengaging transmitting-spindle b⁴. This spindle b⁴ is actuated by a screw and screw-wheel c c' from the first-motion shaft C, driven at a uniform, or it might be differential, speed from the fast and loose belt-pulleys C² C'', mounted on its outer free end. The outer surface of the water-cylinder B (or an index-plate at the side of it) might be marked with divisions to indicate the quantity of water delivered during any given time and motion and position of the piston in its cylinder by a pointer on the spindle B'', or the divisions might be fixed on the spindle B'' and have the pointer stationary. The water would be fed from this cylinder B by the pipe b, as before stated, in among the flour of the kneading-machine A to form the dough. The one spindle a of the kneading-machine A would preferably be driven direct or otherwise from the second spindle C' through the wheels d d' d² of the dynamometer D and actuated, as hereinafter described, by the first-motion pulley-shaft C. The dynamometer D here shown is a modification of the ordinary construction, in which bevel-wheels d d' are secured on the adjacent ends of the driving-shaft C and driven spindle C', and bevel-pinions d² d² gear into these wheels d d' on opposite sides, mounted loose on the transverse spindle d'', secured in the center of the dynamometer D at right angles to the said two spindles C C' between their ends, as shown in Figs. 6 and 7. The one end of the cord D' is attached to the upper part of the circumference of the dynamometer D by a screw-plug at D'', as shown in Fig. 7, and carried down and along the upper part of a tube D², mounted longitudinally under the dynamometer D in brackets D''' at its ends on the sole-plate A³. The cord then passes over the guide-pulley D³ and has its other end brought back and attached at B' to the free end of a spring E, which spring has its other end fixed at E'' to the end of the tube D², in the lower part of which the spring E is mounted, as shown particularly in Fig. 2, or a differential weighted lever might be used instead of the spring E, but in either case so arranged that the cord D' will reciprocate a recording-pencil or marking-pointer e, so as to give it an equal travel for each increment of weight in pounds draft on the cord D'. As will be seen particularly in Figs. 1, 2, and 3, the upper part of the cord D', which actuates the pencil, is attached to a screw-clip e², sliding in the inside of a slit in the upper part of the tube D² and gripped to the slide-block e³, traveling on the outside of the tube D² and carrying the spring-arm e' of the pencil e, hinged to one side of the slide-block e³, a corresponding arm e'' being hinged in like manner to the opposite side of the slide-block e³. A small pulley e''' or other equivalent is mounted on its upper extremity, rolling on the outside of the indicator-barrel F opposite to the pencil e, the two arms e' e'' being gently pulled together by a spring e⁴, attached to them by a small link spindle e⁵, mounted through a slot in the arm e', so that as this spindle e⁵ is turned it may free the pencil e by folding down its arm e' on its hinge or hold it up to mark on the paper when the machine is started to make a diagram, as indicated in this position in Figs. 1, 2, and 3. Instead, however, of the marking metallic pointer or pencil e shown, a set of small marking inking-rollers might be mounted in the upper end of the arm e', as indicated at e˟ in Fig. 3, to roll along and mark the paper in an equivalent manner to the marking-pencil e. This pencil is capable of being turned to act and mark on the lined sheet of paper X, mounted on the indicator-barrel F, the pencil traversing in this case to and fro in the longitudinal direction of the barrel, as indicated by the double-headed arrows e¹⁰ in Figs. 1 and 2, across the division-line x, indicating pounds pressure on the paper, according to the power transmitted through the dynamometer D in driving the kneading-machine A during the time when the water has flowed regularly or differentially onto the flour from the cylinder B, as before described.

The barrel F for receiving the diagram-paper is mounted by end journals on its spindle F' at the upper end of standard-brackets F˟, projecting up from the sole-plate A³, parallel to and over the spring-tube D². It is actuated at a uniform slow speed by the wheel F² on its one end and a pinion and wheel F'' F³, carried on a stud-bracket at F⁴, the wheel $F^3$ being actuated by a pinion $F'''$, mounted on the engaging and disengaging shaft $b^4$, which also actuates the wheel $b'''$ of the spindle $b^3$ of the water-supply cylinder B. The spindle $b^4$, which is actuated from the screw and screw-wheel $c\ c'$ of the first-motion shaft C, has its inner journal end mounted in a weighted eccentric bearing-lever $c^2$, carried in a bracket $c'''$, so that when this weighted lever $c^2$ falls down on the sole-plate $A^3$ it disengages the pinion $F^3\ b'''$, respectively, actuating the gearing of the diagram-barrel F, and the gearing $b'''\ b^3\ b^2\ b''$ of the cylinder B and piston B', supplying the water to the kneading-machine A. After the diagram-paper X has been mounted on the barrel F this weighted lever $c^2$ is lifted up by the attendant into the position shown in Figs. 1, 2, and 6 to put the gearings of the barrel F and of the water-cylinder B into action. The weighted lever is retained by a catch $c''$ on its lower inner end engaging the shorter arm $c^3$ of a two-armed lever, Figs. 1, 2, and 6, fulcrumed on a fixed stud at $c^5$, with its long arm $c^4$ projecting up nearly vertical, all so that the pulling or pushing forward of the upper arm $c^4$ of this lever disengages the eccentric-lever $c^2\ c''$, which by its weight falls down and stops the motion of the said gearing of the barrel F and water-supply cylinder B B' when the diagram has been taken. This disengaging may be made automatic when desired, as by securing a projecting pin $c^6$ on the barrel F, which, as it comes round, would press out the lever $c^4$ just before making a full revolution of the barrel F and its diagram-card, as seen dotted in this disengaged stopped position in Fig. 6. A diagram-sheet X, ruled as described in reference to and shown in Figs. 4 and 5, is wound round the barrel F and secured by longitudinal spring or other clips at its ends, or it might be rubber or other spring hoops at $X^2$ near its ends.

The barrel F, with the paper on it, when put into gear by lifting the weighted eccentric-lever $c^2$ and setting the belt on the fast pulley $C^2$, as before described, would thus be turned at a uniform rate proportionate to the transverse lines $y\ y$ and divisions on it in the circumferential direction, indicating the water added to the flour in the kneading-machine A during that time. Thus the pencil $e$ would trace on the paper a graphical diagram running up from the zero-line $o$ at $e^{10}$ in irregular time to the greatest power and pressure required to mix the flour with the quantity of water absorbed at the same time, as indicated at $x'\ x''$ in Figs. 1, 2, 4, and 5, and trace the curved line down again from the maximum $x''$ and finish the diagram on the return-line $x^2\ x^2$, as indicated by the darts $e^{10}$ in these figures. The stiffness of the dough would be shown by the height of the diagram on the line $x\ x$ from the zero-line $o$ at any given time during the operation to be able to compare these graphic diagrams given by the different qualities of flour, two such different diagrams being shown in Figs. 4 and 5.

My improved simplification of the dynamometer (shown in section in Figs. 1, 6, and 7, and applicable to these flour-testing machines) consists in mounting, as shown in Figs. 8 and 9, instead of bevel-wheels, as heretofore, two spur-wheels $d\ d'$, preferably an external-toothed pinion $d$ and internal-toothed wheel $d'$, respectively, on the adjacent ends of the two spindles C C' within the dynamometer D. These actuate two short spur-wheels $d^2\ d^2$, mounted on loose short parallel spindles $d''$, radially opposite each other within the dynamometer D, the cord D' of which would be counterweighted by a helical spring E, or it might be an accumulative weight, which, as before stated, would give to the pencil or marking-pointer $e$ an equal travel for each pound pressure or increment of weight. This new or improved arrangement and combination of appliances I term a "graphic flour-indicator;" but the same arrangement might be applied on a large scale to bakers' kneading-machines generally to show the actual consistency of the dough, which at present is generally guessed at.

For testing the quality of gluten in the flour I use a second diagram made from a sample of the same flour or of a previously-treated sample, taken as before described, and after adding the quantity of water necessary to hydrate any given sample of flour to its maximum point of hydration I note the loss of tenacity during a long test, say six to twenty-four hours. The new diagram is allowed to revolve continuously and the pencil to describe a line helically around it. The loss in tenacity per hour or other period of time indicated on the diagram will give the quality of the gluten in the sample.

Referring to the arrangement of my flour-testing mechanism or machine shown in Fig. 10, in which the dynamometer D and its cord D' are made to move the diagram-barrel F differentially and in response to the proportion of the power taken to work the kneading-machine A, this being dependent upon the consistency of the dough and regular quantity of water added during the mixing and kneading, I mount the barrel F by its spindle F' on its standards $F^x$ parallel to the shafts C C' of the dynamometer. I have shown these as driven by their pulleys $C^2\ C''$ in the opposite direction to that shown in Fig. 1, so that the cord D' passes over the upper part of the dynamometer-drum D and barrel F to turn these in the directions indicated by the arrows against the power of the spring E, mounted round the under side of an enlarged part of the spindle F' of the barrel F to turn the barrel F and the dynamometer D in the opposite direction to the motive power. Thus then the card X for taking the diagram on in this case would be ruled in the opposite manner to that shown in Figs. 4 and 5—that is to say, the fine lines and divisions $x$ would be ruled longitudinally and the wide lines and divisions $y$ would be ruled circumferentially—and the pencil $e$ in this case is mounted on a screw-spindle $f$, carried in bearing-brackets from the standards $F^x$, actuated by engaging and disengaging bevel-wheels at $f'$ on a spindle $f^2$, mounted in bearing-brackets $f''$ and actuated by a screw and worm-wheel $c$ $c'$ on the first-motion shaft C, so as to traverse the pencil $e$ equal distances for equal times and revolutions of this shaft C and regular or differential supply of water to the kneading-machine A, producing the rising and falling curvilineal lines $x'$ $x''$ $x^2$ $x^2$ of the diagram X in the circumferential direction shown in Fig. 10, instead of in the longitudinal direction as shown and described in reference to Figs. 1, 4, and 5. Otherwise the results and advantages would be substantially the same. However, instead of using a helical spring E in this arrangement a strong coiled spiral or volute spring might be mounted in the barrel F or in a special barrel attached to its axle F'.

Referring to Figs. 11 and 12, the driving mechanism of the dynamometer D and kneading-machine A and barrel F are all substantially the same as described in reference to Figs. 1 to 7, and lettered to correspond, but having here applied a more simple modification of the means of supplying and regulating a uniform or differential quantity of water to the kneading-machine A from the working water-cylinder B B' and screw-wheel gearing shown and described in reference to the first machine, Figs. 1 to 3, while taking the diagram. This modification consists of a vertical cylindrical water-vessel G G', closed at the bottom G, but open at the top G', erected on a bracket at G'' on the frame $A^2$, carrying the kneading-machine A. The vessel is filled with water before starting up to the level of the tube $b$, supplying the water to the machine A. This water-cylinder G has mounted in its upper part a solid metal plunger $G^2$, hung and actuated by a wire or other cord $G^3$, passed over a guide-pulley G'', mounted on the upper end G' of the cylinder G and passed round an enlarged part of the spindle F' of the barrel F, so that as this is slowly turned in the direction of the arrows on it the weighted plunger $G^2$ descends at a slow uniform rate proportionate to the turning of the barrel F, displacing the water in the cylinder G, also at a regular proportionate rate, and delivering it regularly to the kneading-machine A by the tube $b$, as before described; or it might be differentially by varying the shape of the displacing-plunger $G^2$, as indicated by the dotted lines $g$ or otherwise, and which means of supplying the water or any equivalent arrangement may be employed in any of the dynamometers and diagram-barrel arrangements of these flour-testing machines, and although the plunger G is here shown reciprocated by a cord wound round the spindle F' of the barrel F it might be actuated from it positively in both directions by a rack and pinion or other equivalent mechanical motion. An index might be engraved either on the plunger $G^2$ or on the upper outer part of the case G', with a pointer on the plunger $G^2$, the water being filled in at the open cup part $g$ $G^4$.

Figs. 13 and 14 show a mixing machine or trough A with radial arms or mixers $a^4$, mounted on the two spindles $a$ $a$ of the mixing-machine in alternate longitudinal planes when they are driven at different speeds by different-sized pinions $a^2$ $a^3$, as shown in the former arrangements, the one set of arms working up close to the eyes or axle of the other set, as shown in Fig. 14, and may be driven in either direction, and which it is considered will be more applicable for stirring and mixing, breaking up, and testing the materials—such as for some kinds of flours or starches or glutinous substances—than the screw form of dough-mixers $a'$ $a''$ shown in the former arrangements.

I claim as my invention—

1. An apparatus for testing the properties of flour, consisting of a kneading-machine, in combination with dynamometrical devices for indicating and recording the power to work the kneading-machine, and means for automatically supplying water to the flour, substantially as and for the purposes set forth.

2. An appliance for testing and recording the properties of flour, comprising a dynamometer, a kneading-machine, a motive and driven shaft connected with the dynamometer, and a reacting spring E, in combination with a pencil-carrier, a diagram-cylinder, and a water-cylinder, substantially as and for the purposes set forth.

3. In an apparatus for testing and recording the properties of flour, the combination of a kneading-machine, a dynamometer, shafts C C', and indicating-cylinder for measuring the power or strain requisite to drive the kneading-machine in kneading a given sample of flour and liquid and show the consistency of the dough, substantially as set forth.

4. In an apparatus for testing and recording the properties of flour, the combination of a kneading-machine, with a dynamometer provided with spur-gearing, consisting of a central wheel on the driving-shaft, a large internally-toothed wheel on the driven shaft, and intermediate pinions on the dynamometer-case, with a diagram-barrel, a pencil-carrier, and a spring E, substantially as and for the purposes set forth.

5. In an apparatus for testing and recording the properties of flour, the combination of a kneading-machine with a diagram-cylinder, and a water-cylinder provided with a piston, adapted to be moved at a speed proportionate to the speed of the diagram-cylinder, as and for the purposes set forth.

6. In an apparatus for testing the properties of flour, the combination of a kneading-machine, a dynamometer, a spring E, and a pencil-carrier, with a diagram-cylinder, and the diagram X, substantially as and for the purposes set forth.

In testimony whereof I have signed my name to this specification in the presence of two subscribing witnesses.

JAMES HOGARTH.

Witnesses:
R. C. THOMSON,
THOS. S. DUFFIE.